Sept. 2, 1924.

C. H. HOOK

CONTROL VALVE

Filed Feb. 14, 1924

1,506,834

WITNESSES

INVENTOR
Charles Howard Hook
by Winter & Brown
his Attorneys

Patented Sept. 2, 1924.

1,506,834

UNITED STATES PATENT OFFICE.

CHARLES HOWARD HOOK, OF PITTSBURGH, PENNSYLVANIA.

CONTROL VALVE.

Application filed February 14, 1924. Serial No. 692,735.

*To all whom it may concern:*

Be it known that I, CHARLES HOWARD HOOK, a citizen of the United States, and a resident of Pittsburgh, in the county of Allegheny and State of Pennsylvania, have invented a new and useful Improvement in Control Valves, of which the following is a specification.

This invention relates to control valves for fluid fuel. More particularly it relates to such valves having a snap action, adapted to completely open or close a fuel supply passage instantly upon the occurrence of certain predetermined conditions.

The objects of the invention are to simplify the construction, and to improve and render more certain the action of such valve mechanisms. A special object is to reduce friction of the parts utilized to produce snap action of the valve, and also to reduce the number and weight of the parts moving with the valve to a minimum. Other objects and advantages will be apparent to those familiar with the art from the following specification.

Figure 1:
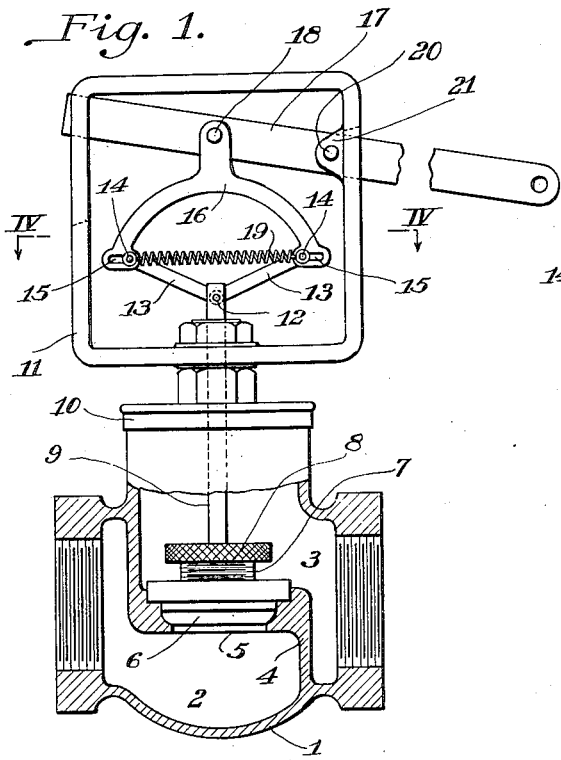
Figure 3:
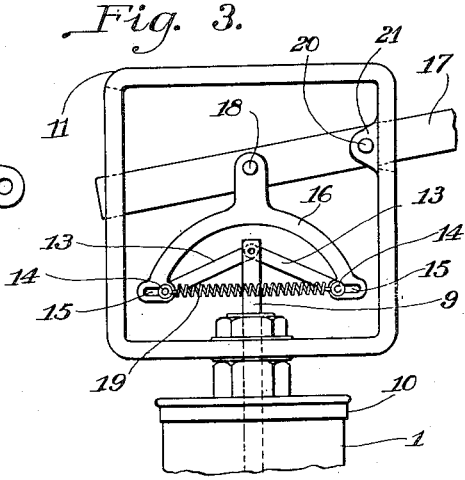
Figure 2:
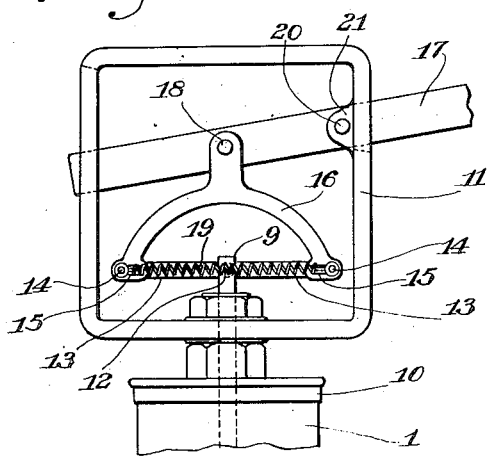
Figure 4:
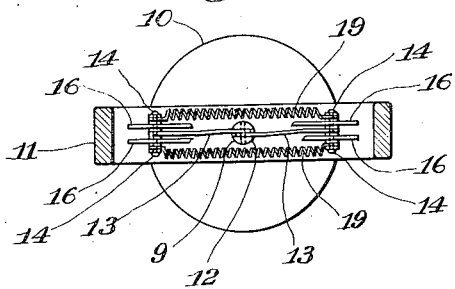

In the accompanying drawing Fig. 1 is a side elevation of the valve operating mechanism, and a partial section through the fuel main and valve seat; Fig. 2 is a side elevation of the valve control mechanism with the valve seated, but with the actuating parts in position just previous to the throwing open of the valve; Fig. 3 is a similar view showing the relative position of the parts immediately after the valve has been thrown open; and Fig. 4 is a horizontal section on the line IV—IV of Fig. 1, showing the relative arrangement and connection of the valve actuating parts.

Snap acting mechanisms adapted instantly to completely open or completely close fluid flow control valves, operating only at the extremities of movement of a driving member, so that the control valve is thrown to entirely open position when the driving member has moved to a certain predetermined position, and to entirely closed position when the driving mechanism has moved to a certain other predetermined position, the valve remaining stationary during all intermediate movement of the control member, are old in the art. For example, my Patent #1,477,647 of December 18, 1923, shows such a structure. The present invention is an improvement in construction on such prior art valves, the function of the device as a whole being old.

The valve illustrated and described herein is particularly adaptable for controlling fuel gas for boiler furnaces, or other forms of heaters, but the mechanism is applicable to any form of fluid flow control.

Referring to the drawings there is illustrated a valve casing 1 adapted to be inserted in a fluid main in the usual manner, and having an inlet chamber 2 and outlet chamber 3, separated by a diaphragm 4, through which is a port 5, controlled by a valve member 6, of any suitable form. The upper part of the valve member carries a threaded extension 7, engaged by a rotary member 8, which carries by a swivel connection a stem 9. This stem extends through a suitable stuffing box arrangement in the top 10 of the valve casing and has a forked terminal outside the casing. Rigidly mounted on the top of the valve casing is a rectangular frame 11, through the lower side of which the valve stem 9 extends. Pivotally attached to the forked upper end of the stem 11 by means of a pin 12 are two similar links 13. Preferably these links engage the pin 12 within the fork formed in the end of the stem 9, as illustrated in Fig. 4.

The other ends of the links 13 are perforated and engage the middle portions of pins 14, which extend through slots 15, in the lower ends of two cooperating fork members 16, the upper ends of which are pivotally attached upon opposite sides to a lever member 17 by a rivet or pin 18. Coil springs 19 are attached at their ends to the pins 14, on the outsides of the yoke members 16, as illustrated in Fig. 4. The links 13, yoke members 16, and springs 19 are preferably separated on the pins or rivets 14 by washers, to secure the proper lateral spacing.

The lever 17 extends through vertical slots in the sides of the frame 11, and is pivotally attached to the frame by means of a rivet or pin 20, extending through lugs 21, provided on each side of the lever. The slot on the opposite side is of sufficient length to allow the free end of the lever to swing up and down to the two limiting positions illustrated in Figs. 1 and 3.

The outer end of the lever 17 is attached by any suitable means to some such control device as a pressure gage, thermostat, or the like, according to the uses to which the control valve is put. This control device moves the lever up or down with variation in the element that is to be indirectly controlled by supply of fluid through the casing 1, as will be readily understood without further illustration or description.

The operation of the valve control mechanism is as follows:

In Fig. 1 the parts are shown in relative position as just after the valve has been thrown to closed position. It will be understood that from this position the outer end of the lever 17 will be slowly raised by the thermostat, pressure gage, or the like, as temperature, steam pressure, etc., drops towards a predetermined minimum. As the inner end of the lever moves down the yokes or forks 16 are depressed, the links 13 are depressed at their outer ends, the coil springs 19 are extended, the pins 11 slide in the slots 15, until the mechanism reaches the position indicated in Fig. 2, wherein it is exactly balanced. During all of this movement of the actuating mechanism the valve itself is stationary. Upon further depression of the inner end of the lever 17, the outer ends of the links 13 pass below the pivoted point of the inner ends, and the force of the springs immediately snaps the valve stem upward to the position shown in Fig. 3. The valve is thus instantly and completely opened when the lever reaches a predetermined position. Fuel or other fluid flows through the valve, as for example gas to the furnace of a boiler, and as steam pressure, temperature, etc., rises, the control element commences to depress the outer end of the lever. As the yokes 16 move upward the links 13 will again approach a horizontal position, and after they pass the horizontal position, not illustrated, the valve immediately be snapped shut, the parts again occupying the position shown in Fig. 1. In all intermediate positions of the lever the valve retains its open or closed position, and is securely held therein by force of springs 19.

It will be observed that in this mechanism the outer ends of the links 13 are attached to pins 14 which are freely movable in the slots 15. Therefore the links 13 have a very small frictional contact with the yoke members 16, not bearing directly thereon in any position. It will be further observed that in throwing the valve to open or closed position the only members to be moved other than the valve and its stem, are the links 13, and the pins 14, all of very small weight. It will be further observed that the coil springs 19 have a comparatively small difference in length between their retracted and most extended positions. Consequently, springs of more nearly constant force may be used in this embodiment than in those wherein pairs of toggle links and similar arrangements are used. In some prior art mechanisms the extended condition of the spring requires a length approximating twice the length of the shorter position. Manifestly there is a considerable variation in spring tension in such devices.

Owing to the small amount of friction and small inertia due to weight of parts, this valve is decided and quick in action, and very delicate in its balance. Consequently the action of the control mechanism is more positive and dependable than in prior devices, and due to the greater sensitiveness of the balance obtainable, the limits of control of the valve may be more accurately fixed.

I claim:

1. A mechanism for opening and closing a fluid supply main, comprising a casing having a passage therethrough, a valve adapted to close the passage, a stem attached to the valve and extending to the exterior of the casing, a frame rigidly mounted outside the casing, a movable actuating member mounted on the frame, a fork carried by the actuating member inside the frame, a pair of links pivotally attached to the exterior end of the valve stem at their inner ends, and slidably connected to the ends of the said fork at their outer end, and springs constantly urging the outer ends of the links towards each other.

2. A mechanism for automatically opening and closing a fluid supply main, comprising a casing having a passage therethrough, a valve adapted to close the passage, a stem movable with the valve and extending to the exterior of the casing, a guide frame rigidly mounted outside the casing, an actuating lever mounted on the frame and guided by slots in the sides thereof, a fork carried by the actuating lever inside the frame, a pair of links pivotally attached at their inner ends to the exterior end of the stem and slidably attached at their outer ends to the ends of the fork, and tension springs connected across the outer ends of the links and constantly urging them together, whereby to throw the valve to open or closed position at certain positions of the actuating member.

3. A mechanism for automatically opening and closing a fluid supply main, comprising a casing having a passage therethrough, a valve adapted to close the passage, a stem movable with the valve and extending to the exterior of the casing, a guide frame rigidly mounted outside the casing, an actuating lever mounted on the frame and guided by slots in the sides thereof, a fork carried by the actuating lever inside the frame, the ends of the fork having laterally disposed slots therein, a pair of links pivotally attached at their inner ends to the exterior end of the stem and slidably attached at their outer ends to the ends of the fork by means of the said slots therein, and tension springs connected across the outer ends of the links and constantly urging them together, whereby to throw the valve to open or closed position at certain positions of the actuating member.

4. A mechanism for opening and closing a fluid supply main, comprising a casing having a passage therethrough, a valve adapted to close the passage, a stem movable with the valve and extending to the exterior of the casing, an actuating member mounted to move back or forth in the axial line of the stem, a fork carried by the actuating member, a pair of links pivotally attached to the exterior end of the stem at their inner ends and slidably connected at their outer ends to the fork, and tension springs across the outer ends of the links constantly urging the outer ends towards each other, whereby to throw the valve to open or closed position at certain positions of the actuating member.

5. A mechanism for opening and closing a fluid supply main, comprising a casing having a passage therethrough, a valve adapted to close the passage, a stem movable with the valve and extending to the exterior of the casing, an actuating member mounted to move back or forth in the axial line of the stem, a fork carried by the actuating member and having laterally disposed slots in its outer ends, a pair of links pivotally attached to the exterior end of the stem at their inner ends and slidably connected at their outer ends to the slots in the ends of the fork, and tension springs connected across the outer ends of the links constantly urging the outer ends towards each other, whereby to throw the valve to open or closed position at certain positions of the actuating member.

6. A mechanism for opening and closing a fluid supply main, comprising a casing having a passage therethrough, a valve adapted to close the passage, a stem movable with the valve and extending to the exterior of the casing, a fork member mounted outside the casing and movable in the axial line of the said stem, actuating means to move the fork, a pair of links pivotally attached at their inner ends to the exterior end of the stem and slidably connected at their outer ends to the ends of the said fork, and tension springs constantly urging together the outer ends of the said links, whereby as the fork moves up and down in the axial line of the stem the valve is thrown to closed and open positions at the ends of predetermined movements of the said fork.

7. A mechanism for opening and closing a fluid supply main, comprising a casing having a passage therethrough, a valve adapted to close the passage, a stem movable with the valve and extending to the exterior of the casing, a member disposed across the axial line of the stem, means to move said member in the axial line of the stem, a pair of links pivotally attached to the outer end of the stem at their inner ends and slidably attached at their outer ends to the ends of the said cross member, and means constantly urging the outer ends of the links toward each other, whereby to throw the valve to open or closed position upon arrival of the cross member at a fixed point in its down or up travel.

8. A mechanism for opening and closing a fluid supply main, comprising a casing having a passage therethrough, a valve adapted to close the passage, a stem attached to the valve and extending to the interior of the casing, a guide frame rigidly mounted outside the casing, a movable actuating lever member pivotally mounted on the frame and guided thereby, a pair of fork members pivotally attached to the sides of the actuating lever inside the frame, the outer ends of the fork member having laterally disposed elongated openings therein, pins slidably mounted in the said openings and connecting the pair of fork members, a pair of links pivotally attached to the exterior end of the valve stem at their inner ends, and to the slidable pins in the fork members at their outer ends, and tension springs constantly urging the outer ends of the links together, whereby to throw the valve to open and closed positions at the end of certain predetermined movements of the actuating lever.

In testimony whereof, I sign my name.

CHARLES HOWARD HOOK.